(12) United States Patent
Kroll et al.

(10) Patent No.: US 6,623,222 B1
(45) Date of Patent: Sep. 23, 2003

(54) MACHINE TOOL WITH HORIZONTAL WORK SPINDLE

(75) Inventors: Dieter Kroll, Rabenau (DE); Wolfgang Armleder, Rottweil (DE)

(73) Assignee: Schwäbische Werkzeugmaschinen GmbH (DE)

( * ) Notice: Subject to any disclaimer, the term of this patent is extended or adjusted under 35 U.S.C. 154(b) by 0 days.

(21) Appl. No.: 09/857,757

(22) PCT Filed: Dec. 6, 1999

(86) PCT No.: PCT/DE99/03892

§ 371 (c)(1),
(2), (4) Date: Aug. 31, 2001

(87) PCT Pub. No.: WO00/34004

PCT Pub. Date: Jun. 15, 2000

(30) Foreign Application Priority Data

Dec. 9, 1998 (DE) .......................... 198 57 013

(51) Int. Cl.⁷ .............................................. B23Q 39/04
(52) U.S. Cl. .......................... 409/235; 29/563; 408/44; 408/71; 408/234; 409/191; 409/198
(58) Field of Search .................. 29/563, 564; 409/190, 409/191, 192, 198, 235, 203, 221; 408/43, 44, 71, 234

(56) References Cited

U.S. PATENT DOCUMENTS

| | | | | |
|---|---|---|---|---|
| 2,358,389 A | * | 9/1944 | Ewart et al. | 408/44 |
| 3,226,742 A | * | 1/1966 | Gnutti | 408/44 |
| 3,817,650 A | | 6/1974 | Reich | |
| 4,655,652 A | * | 4/1987 | Schissler | 409/132 |
| 4,712,282 A | | 12/1987 | Romeu | |
| 5,183,374 A | | 2/1993 | Line | |
| 5,314,397 A | * | 5/1994 | Mills et al. | 483/30 |
| 5,575,597 A | * | 11/1996 | Bailey et al. | 409/201 |
| 5,688,084 A | * | 11/1997 | Fritz et al. | 409/202 |
| 5,940,948 A | * | 8/1999 | Rehm | 29/33 P |
| 6,273,653 B1 | * | 8/2001 | Horn et al. | 409/235 |

FOREIGN PATENT DOCUMENTS

| | | | | |
|---|---|---|---|---|
| DE | 1477497 A | * | 5/1969 | 408/234 |
| DE | 19639527 | | 4/1998 | |
| DE | 19645324 | | 5/1998 | |
| EP | 0015372 | | 9/1980 | |
| EP | 0607793 | | 7/1994 | |
| EP | 0816012 | | 1/1998 | |
| EP | 0845325 | | 6/1998 | |
| FR | 2555086 A | * | 5/1985 | 409/235 |
| SU | 1380915 | | 3/1988 | |
| WO | 9005053 | | 5/1990 | |
| WO | 9727024 | | 7/1997 | |
| WO | 9813170 | | 4/1998 | |
| WO | 9857777 | | 12/1998 | |

OTHER PUBLICATIONS

International Preliminary Examination Report for International Appln. No. PCT/DE99/03871 corresponding to related application Serial No. 09/857,764.

Translation of Dec. 27, 2000 International Preliminary Examination Report in Corresponding International Application PCT/DE99/03892.

* cited by examiner

Primary Examiner—Daniel W. Howell
(74) Attorney, Agent, or Firm—Polster, Lieder, Woodruff & Lucchesi L.C.

(57) ABSTRACT

In a machine tool (2), in particular for cutting treatment of workpieces (9) comprising a machine frame, a workpiece table (15) borne on the machine frame and an approximately horizontally disposed processing unit (8) which is mounted to the machine frame, the processing unit (8) is mounted also to a support (6) of the machine frame overlapping the workpiece table (15). This upper mounting prevents displacement of the processing unit relative to the workpiece due to the forces acting thereon during processing, in particular in the Z-direction. These forces are accommodated by the machine frame which is self-contained through the support.

7 Claims, 4 Drawing Sheets

MACHINE TOOL WITH HORIZONTAL WORK SPINDLE

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

The invention concerns a machine tool, and in particular, a machine tool for cutting treatment of workpieces, comprising a machine frame, a workpiece table mounted on the machine frame, and an approximately horizontally disposed processing unit which is mounted to the machine frame.

In known circular table machine tools, several processing units having horizontal work spindles (Z-direction) for processing a workpiece provided on the circular table, are arranged about the rotatably disposed circular table. The processing units are mounted on the side of the base of the circular table, respectively. In machine tools of transfer lines, the processing units are also mounted to the side of the base of the machine tool.

In certain applications, e.g. high-speed or high-precision treatment or heavy cutting, displacement, in particular in the Z-direction, can occur due to high acceleration and processing forces between the workpiece and the tool, such that the desired precision cannot be achieved. Such forces occur in particular if the workpiece and processing unit are movable relative to one another in this direction.

It is therefore an object of the present invention to effectively prevent such displacements between the workpiece side and the tool side in machine tools of the above-mentioned type.

SUMMARY OF THE INVENTION

This object is achieved in accordance with the invention in a surprisingly simple manner in that the processing unit is mounted also to an upper support of the machine frame which overlaps the workpiece table.

While with the hitherto known machine tools, the horizontal processing unit is mounted only at the bottom of the machine frame, in accordance with the invention the processing unit also is mounted via the upper support at the top of the machine frame. This upper mounting prevents displacement of the processing unit—which was hitherto possible—relative to the workpiece due to the forces acting thereon during processing, in particular in the Z-direction. These forces are accommodated in accordance with the invention only by the machine frame which is self-contained through this upper support. This frame can be produced as a one-piece casting or be composed of several interconnected, in particular welded, individual parts. The inventive machine tool can have one or more spindles.

In preferred embodiments of the invention, the upper support overlaps the workpiece table and extends from a side of the frame opposite to the processing unit. It is also possible that the support overlaps the workpiece table or the processing unit from another side.

In a further advantageous embodiment, the processing unit is displaceably guided on the machine frame in at least one guide which is mounted to the upper support. A slide of a slide unit can e.g. be guided in this at least one guide by means of which slide unit a work spindle is displaced in the X, Y and Z direction.

The at least one guide extends preferably approximately horizontally on the upper support to guide an X slide of the processing unit. This horizontal guide mounted to the upper support forms the upper mounting of the processing unit on the machine frame.

In one embodiment of the invention, the upper support is supported on the machine frame on the side of the processing unit. For this purpose, e.g. at least one, and preferably two, vertical supports, provided on the side of a processing window of the processing unit, can be provided on the machine frame. The at least one approximately vertical guide can be provided on the vertical support to guide a Y slide of the processing unit. This vertical guide forms the upper mounting of the processing unit on the machine frame.

In another embodiment of the machine tool, the workpiece table is disposed to be rotatable about a central support of the machine frame extending upwards and beyond the workpiece table, wherein the upper support is mounted to said central support to radially overlap the workpiece table. In such a circular table machine tool, the forces acting on top onto the processing unit, in particular in the Z-direction, are transferred via the overlapping upper support and the central support to the machine frame.

In a further development of this circular table machine tool, the workpiece table is mounted to the central support via a pivot bearing provided below and above the workpiece to be treated. Through guiding of the forces acting on the workpiece or the workpiece table into the central support above and below the processing plane, the forces acting on the circular table above its lower pivot bearing are accommodated by the machine frame.

In another further development of the circular table machine tool, several upper supports, each overlapping the workpiece table and offset in the circumferential direction of the central support, are disposed for several processing units on the projecting central support. The upper supports can be combined to form one single upper support having several arms.

In other embodiments of the inventive machine tool, opposing sides of the upper support are provided with one processing unit each. In such a machine tool, which can be used in particular as a machine tool of a transfer line, the forces acting from above onto the two processing units in the Z-direction, are transferred to the machine frame via the same overlapping upper support.

Further advantages of the invention will be apparent to those skilled in the art from the description and the drawings. The features mentioned above and below in accordance with the invention can be used individually or collectively in any arbitrary combination. The embodiments shown and described are not to be understood as an exhaustive enumeration but rather in an exemplary character for describing the invention. The invention is schematically shown in the figures to emphasize the essential features of the invention. The illustrations are not necessarily to scale.

DETAILED DESCRIPTION OF THE INVENTION

Figure 1:
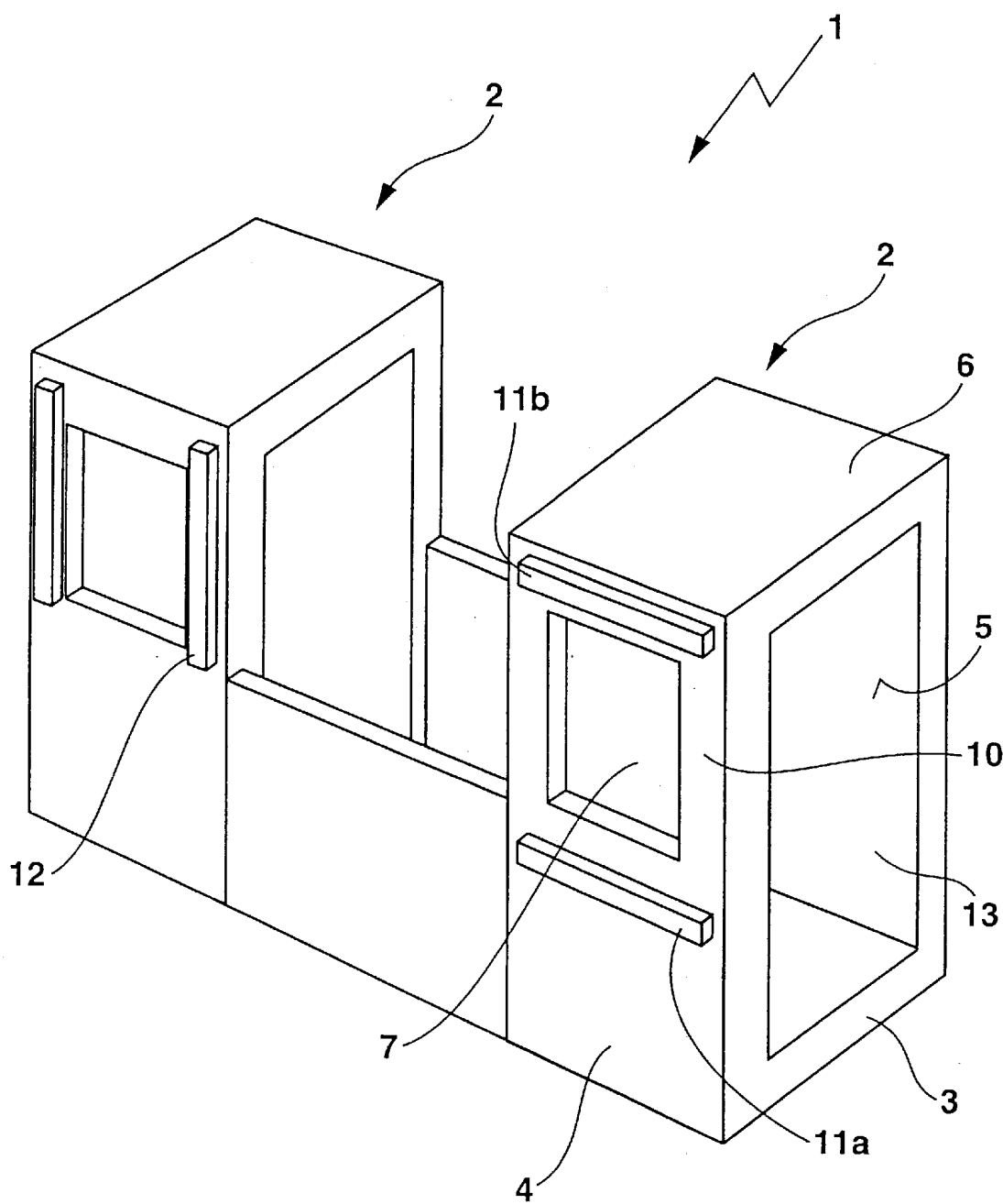
FIG. 1 shows a perspective view of a transfer line comprising two machine tools in accordance with the invention without workpiece table and processing units.

FIG. 1 shows a transfer line 1 having two machine tools 2. The workpieces supplied through the transfer line 1 in the X direction are processed one after the other by both machine tools 2.

Each machine tool 2 comprises one frame-like machine frame with a base support 3, two side walls 4,5 and an upper support 6. The side wall 4 is provided with a processing opening 7 through which passes a processing unit 8 (FIG. 2) mounted to the side wall 4, into the inside of the machine frame for processing a workpiece 9. This processing opening 7 is laterally defined by two vertical supports 10 of the side wall 4 through which the upper support 6 is supported on this side. The processing units are displaceably guided on the outside of the side wall 4 in two horizontal or vertical guides 11a, 11b and 12 in the X or Y direction. Each machine tool 2 has one opening 13, which is open in the X direction, on both sides for passage (transfer) of the workpiece.

Figure 2:
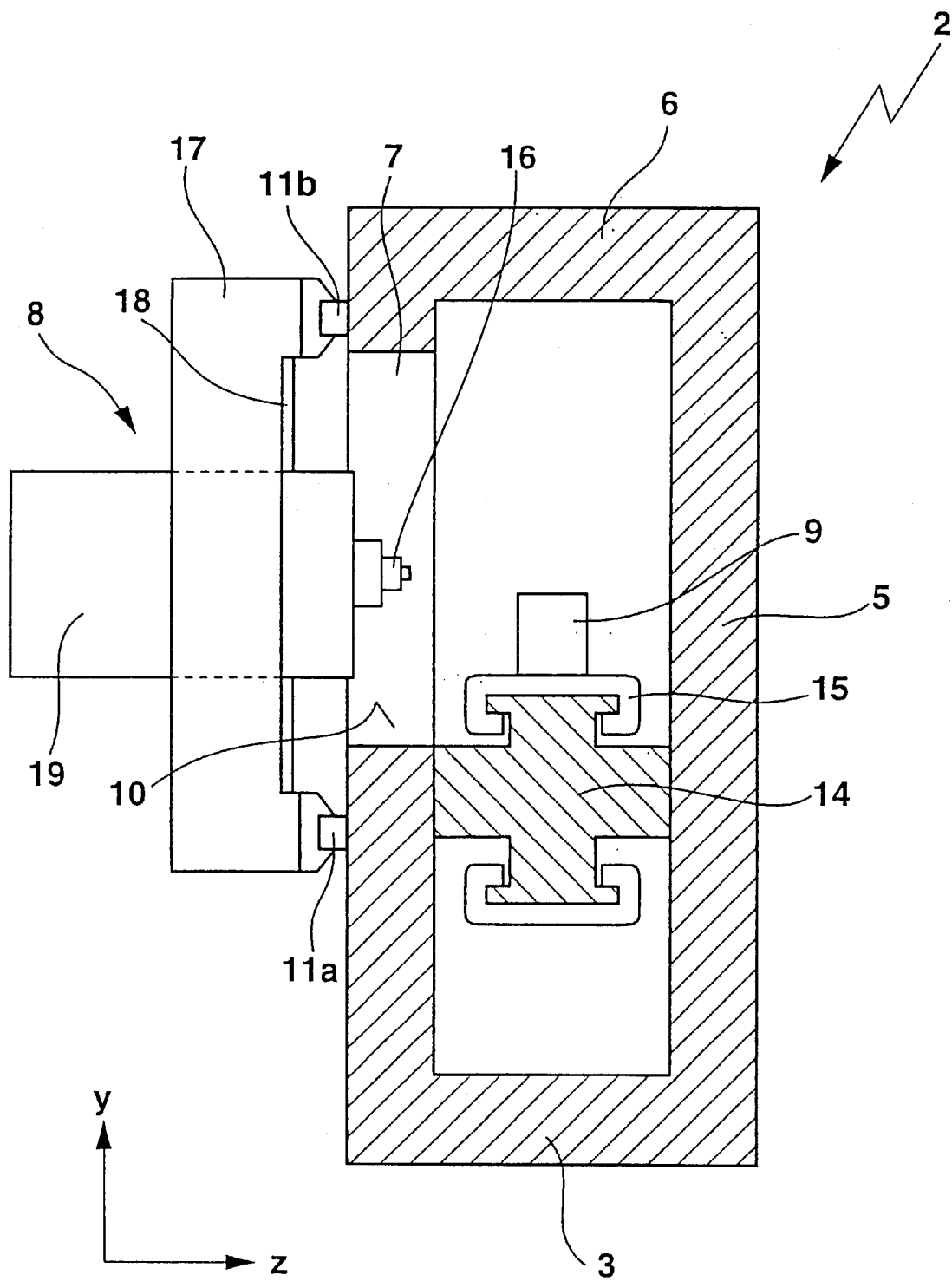
FIG. 2 shows a longitudinal section of the front machine tool of FIG. 1 including workpiece table and a horizontal processing unit disposed on the side.

As shown in FIG. 2, a workpiece support 14 is mounted in the inside of the machine frame on top of which a workpiece table 15 is displaceably disposed for transport in the X direction and below for return transport in the opposite direction. The processing unit 8 is mounted below the processing plane of its horizontally disposed work spindle 16 in the lower horizontal guide 11a and above the processing plane in the upper horizontal guide 11b. An X slide 17 of a slide unit is guided in the guides 11a, 11b by means of which slide unit the work spindle 16 can be displaced in the X, Y and Z directions. For this purpose, vertical guides 18 are provided on the X slide 17 for a Y slide 19 which bears against a sleeve-like Z slide (not shown) with the work spindle 16 which can be displaced in the Z direction. The sleeve-like Z slide is preferably constructed as shown in copending International Application WO 0034003 (which designated the United States), entitled "Machine Tool With A Horizontal Spindle", and which is incorporated herein by reference.

The forces acting in the Z direction during relative displacement of the work spindle 16 and workpiece 9 and in particular during processing of the workpiece 9 with the tool clamped in the work spindle 16, are guided below via the lower guide 11a into the side wall 4 and above via the upper guide 11b and the upper support 6 into the side wall 5 and completely accommodated by the machine frame.

Figure 3:
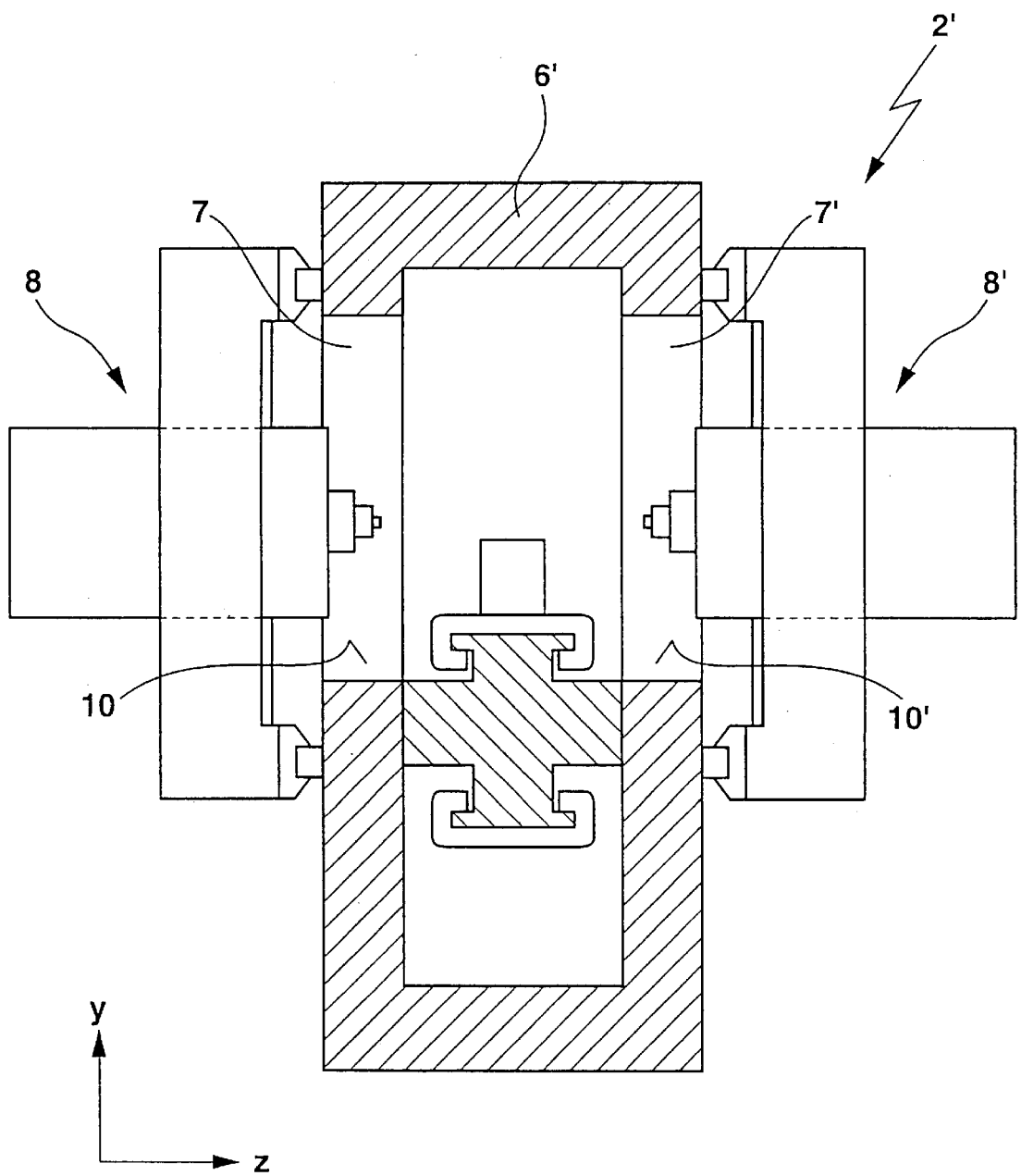
FIG. 3 shows a view corresponding to FIG. 2 of an inventive machine tool comprising two laterally opposing horizontal processing units.

In the machine tool 2' shown in FIG. 3, a further processing unit 8' which is identical to the processing unit 8 is disposed opposite thereto, which also engages the interior of the machine frame through a processing opening 7' for processing the workpiece. The upper support 6' which is carried via the supports 10,10' connects the two processing units 8,8' with force such that same are mounted also above the workpiece relative thereto and to one another in the Z-direction in a non-displaceable fashion.

Figure 4:
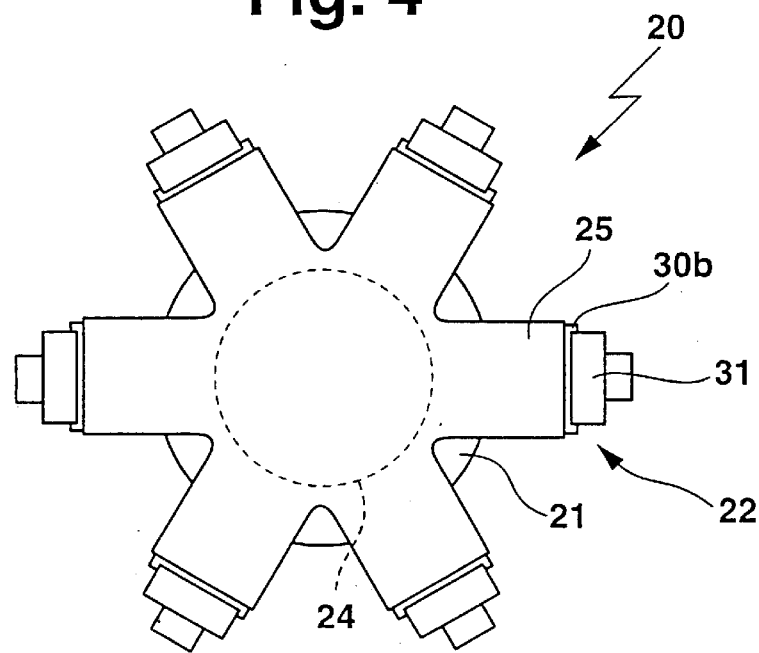
FIG. 4 shows a top view of an inventive circular table machine tool having several horizontal processing units disposed laterally about the workpiece table.
Figure 5:
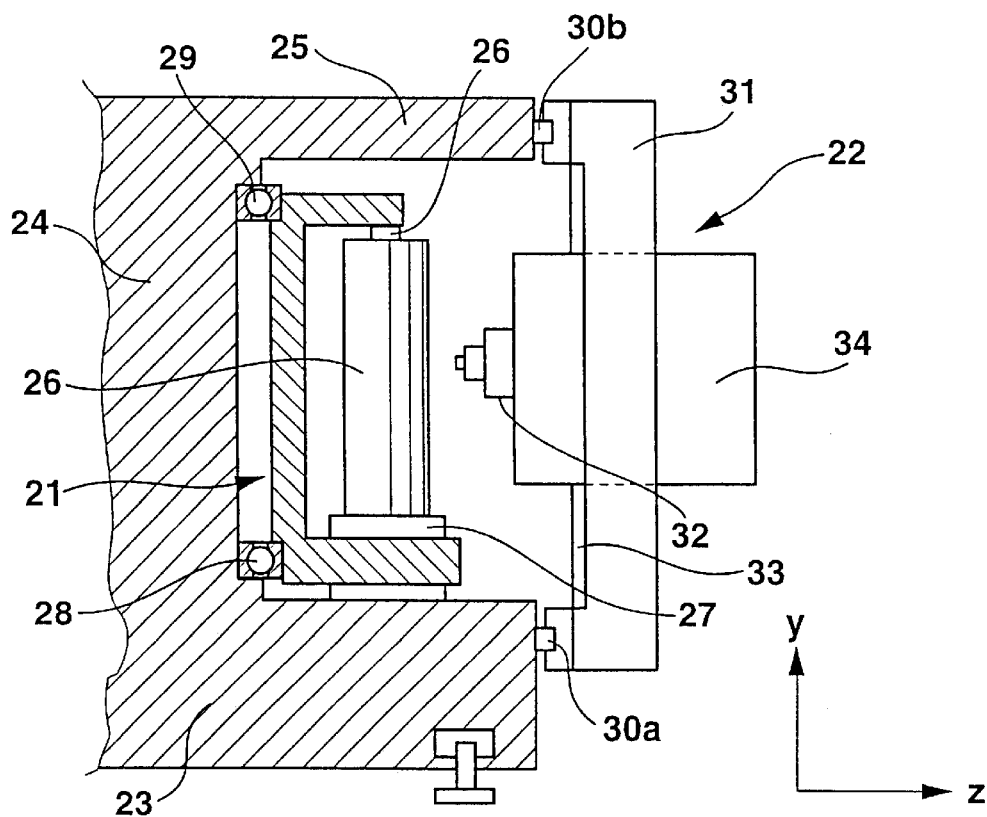
FIG. 5 shows a longitudinal section of the machine tool of FIG. 4 in the region of a horizontal processing unit.

FIG. 4 shows a circular table machine tool 20 having six horizontal processing units 22 disposed laterally about the workpiece table 21 formed as circular table. The machine frame of this machine tool 20 comprises a six-armed base support 23 (FIG. 5), a vertical central support 24 projecting like a column over the workpiece table 21 and six upper supports 25 mounted thereto; each upper support 25 radially overlapping the workpiece table 21. These six upper supports 25 can be formed in one piece through a single six-armed support. The workpiece 26 to be processed is clamped to the workpiece table 21, having an approximately C-shaped cross-section, at the top 26 and bottom 27, wherein the workpiece table 21 is disposed in a lower and an upper pivot bearing 28,29 such that it can pivot or rotate about the central support 24.

The processing units 22 are mounted to the machine frame on the base support 23 below the workpiece 26 to be processed and also above on the upper support 25. For this purpose, each processing unit 22 comprises lower horizontal guides 30a on the base support 23 and upper horizontal guides 30b on the upper support 25 in which the processing unit 22 is displaceably guided in the X direction. An X slide 31 of a slide unit is guided in these guides 30a,30b by means of which slide unit a horizontal work spindle 32 can be displaced in the X, Y and Z directions. For this purpose, the X slide 31 is provided with vertical guides 33 for a Y slide 34 in which again a sleeve-like Z slide (not shown) with the work spindle 32 is disposed in a manner displaceable in the Z direction.

The forces acting radially (in the Z-direction) onto the processing unit 22 during relative displacement of the work spindle 32 and workpiece 26 and in particular the forces acting during processing of the workpiece 26 with the tool clamped into the work spindle 32 are guided via the two guides 30a,30b into the base support 23 and the upper support 25 into the central support 24, respectively, and thereby completely accommodated by the machine frame. The forces acting on the workpiece 26 are diverted at the bottom via the lower mounting 27 and the lower pivot bearing 28 and above via the upper mounting 26 and the upper pivot bearing 29 onto the central support 24 and thus also onto the machine frame.

As various changes could be made in the above constructions without departing from the scope of the invention, it is intended that all matter contained in the above description or shown in the accompanying drawings shall be interpreted as illustrative and not in a limiting sense.

What is claimed is:

1. A machine tool for processing workpieces comprising a machine frame having an upper support; a workpiece table mounted on the machine frame, the upper support overlapping the workpiece table; and an approximately horizontally disposed processing unit; the processing unit being mounted to both the machine frame and to the upper support of the machine; wherein the machine frame includes a central support which projects upwardly and beyond the workpiece table; the workpiece table being pivotable about the central support; the upper support of the processing unit extending approximately radially from the central support.

2. The machine tool according to claim 1, wherein upper support overlaps the workpiece table from the side opposing the processing unit.

3. The machine tool according to claim 1, wherein the processing unit is displaceably guided on the machine frame in at least one guide which is mounted to the upper support.

4. The machine tool according to claim 3, wherein the at least one guide extends approximately horizontally on the upper support.

5. The machine tool according to claim 1, wherein the workpiece table is mounted to the central support via pivot bearings provided below and above the workpiece to be processed.

6. The machine tool according to claim 1, wherein several overlapping supports are disposed on the projecting central support which are offset in its circumferential direction.

7. The machine tool according to claim 6 wherein there is a processing unit associated with each of the several overlapping supports.

* * * * *